United States Patent [19]

Fry et al.

[11] Patent Number: 4,637,603

[45] Date of Patent: Jan. 20, 1987

[54] FISHING SIMULATOR

[76] Inventors: John A. Fry, 331 Deodar La., Bradbury, Calif. 91010; Douglas B. Robinson, 1900 N. Altadena Dr., Pasadena, Calif. 91107

[21] Appl. No.: 675,355

[22] Filed: Nov. 27, 1984

[51] Int. Cl.[4] ...................... A63B 21/24; A63G 31/02
[52] U.S. Cl. .................................... 272/1 R; 272/129; 434/247
[58] Field of Search ...................... 73/862.44; 272/1 R, 272/129, 133; 273/140; 434/219, 225, 247

[56] References Cited

U.S. PATENT DOCUMENTS

| | | | |
|---|---|---|---|
| 2,544,128 | 3/1951 | Bell | 272/1 R |
| 3,712,613 | 1/1973 | Feather | 272/129 |
| 3,874,659 | 4/1975 | Aharoni | 272/129 |

*Primary Examiner*—Harland S. Skogquist
*Attorney, Agent, or Firm*—Christie, Parker & Hale

[57] ABSTRACT

A device is set forth for simulating a fish for operation of a rod and reel. The device includes a frame, a drum journalled to the frame with the fishing line attached to the drum. A motor and clutch are provided for applying a selected torque to the drum to tension the line and simulate the pull of a fish. Also provided is a track to support and guide a carriage. Mounted to the carriage is a pulley. The fishing line is reeved about the pulley and thereafter connected to the drum. By adjusting the position of the carriage and pulley the position of the fish is simulated.

12 Claims, 5 Drawing Figures

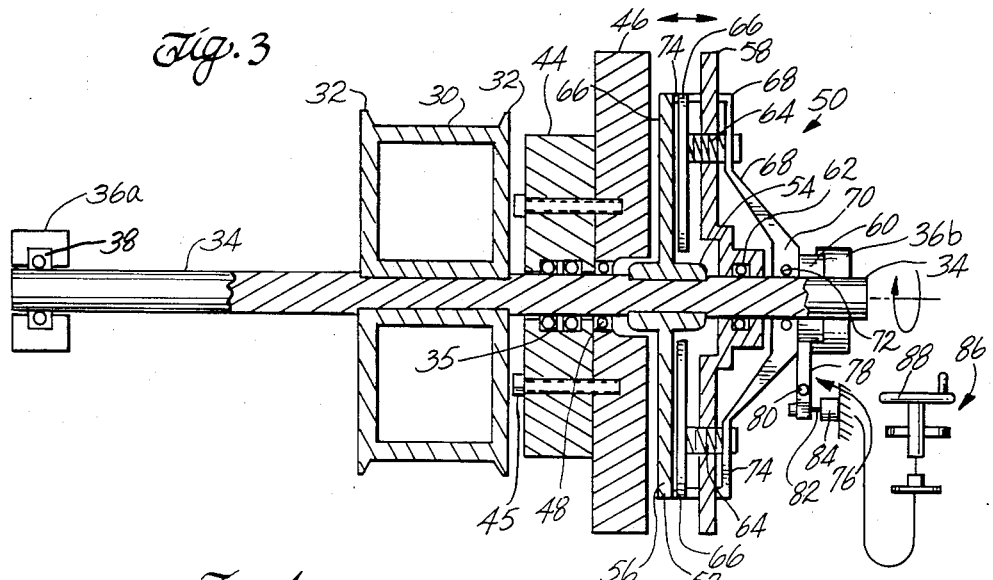
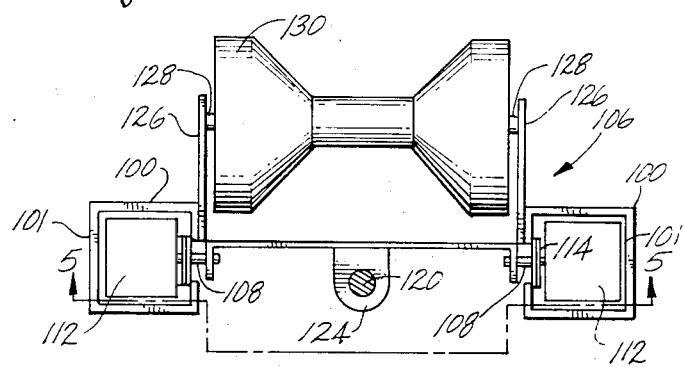
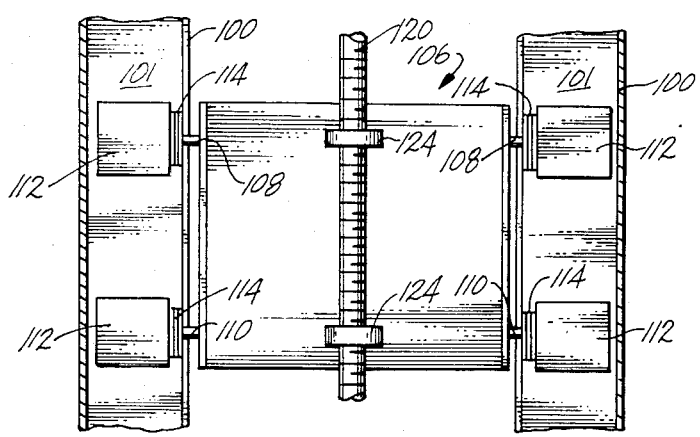

FISHING SIMULATOR

FIELD OF THE INVENTION

This invention relates to fishing equipment and more particularly to a device for simulating a fish on a fishing line.

BACKGROUND OF THE INVENTION

In fishing a rod and reel are provided, the reel having a spool containing a supply of fishing line. To play out and retrieve fishing line the spool is rotatably supported at the reel. The spool is rotatable in a first direction into play out the line and in a second direction to retrieve the line. The reel is provided with means for exerting drag on the spool rotation in the first direction which acts to resist the playing out of the line when fighting a fish. For example, when a fish runs, i.e., swims away from the fisherman or sounds, i.e., dives, the line is tensioned and unwound from the spool against the drag. Without drag the unwinding would be uncontrolled and would offer no resistance to the fish. By imposing a drag, the running and sounding of the fish is restrained which acts to tire the fish and which also necessarily results in the tensioning of the line. To retrieve the line to reel in the fish the spool is adapted to be rotated typically by a handle coupled thereto to rewind the line.

Contributing to the success of fishing is the cooperation between a properly selected reel, rod and line. Reels are adapted for different fishes, i.e., larger, heavy duty reels for large fishes such as tuna, marlin or the like with smaller more compact reels for smaller fishes such as trout, bass or the like. The rod must be selected to have the strength, flexibility and overall feel to meet the fisherman's need.

Rods and reels can be expensive being as much as several thousands of dollars. Heretofore there has been no means by which a fisherman can try out a chosen rod/reel combination before purchasing and actually using the combination. Accordingly, the fisherman may find out only after some period of time and use that either or both the rod and reel were improperly selected.

Over and above the inability to try out a rod and reel combination under simulated conditions there has been no means by which a novice can experience fighting a fish without actually catching one. Particularly, there has been no means by which to educate and prepare a fisherman physically, mentally or tactically for catching a fish and, more particularly, for catching the large fishes. All too often a novice is not prepared to catch and play the large game fishes resulting in the fish getting away or having to be released because the fisherman has become exhausted.

SUMMARY OF THE INVENTION

There is, therefore, provided in the practice of the present invention a device for simulating a fish. By this device the action of a fish can be simulated for trying a rod/reel-line combination and for experiencing the actual playing of a fish for physical conditioning, for practice and for learning of the tactics required for playing a fish.

Toward this end, the device includes a frame having a drum journalled thereto. The line from the rod and reel is attached to the drum. Means are included for applying a torque to the drum to simulate the pull of a fish. By adjusting drag or retrieving line against such torque the play of a fish can be simulated. To more closely simulate the action of a fish means are provided for adjusting the torque applied to imitate different sizes of fishes, or the increased or decreased pull of a fish during the fighting of the fish.

In a further embodiment, the device includes a track. Preferably, the track is inclined to have an end remote from the frame. Movably disposed along the track are line guiding means embodied as a pulley. Means are provided for adjusting the position of the pulley along the track between the frame and its remote end. For this purpose, reversible drive means are provided which rotate a screw shaft. The line guiding means are threadably coupled to the screw shaft. Operation of the drive means rotates the shaft to move the guiding means along the track. A control is provided for selective operation of the motor to move and locate the pulley as desired.

The line from the rod and reel is reeved about the guiding means and is connected to the line tensioning means which include the drum and the means for applying torque the drum referred to above. By selectively controlling the torque and the position of the line guiding means the action of virtually any fish, large or small, can be simulated. The positioning of the guiding means simulates the location of the fish and whether it is running or sounding. The tension means simulates the pull of the fish.

Opposite the track the device may be provided with a fishing chair or means for mounting a fishing chair of the type used in fishing for large salt water fishes.

Accordingly, the device is adapted for testing rod and reel combinations, for training the fish-handling techniques, and for other purpose such as testing fishing line under performance conditions and for physical conditioning.

BRIEF DESCRIPTION OF THE DRAWINGS

These and other features and advantages of the present invention will become appreciated as the same becomes better understood with reference to the following specification, drawings and claims wherein:

FIG. 3 is a partial section view of the means for tensioning the fishing line;

FIG. 4 is an end section view of the yoke for the device showing the means for guiding the fishing line and for simulating the position of the fish; and FIG. 5 is a bottom view of the guiding means of FIG. 4 taken along 5—5 of FIG. 4.

DETAILED DESCRIPTION

Figure 1:
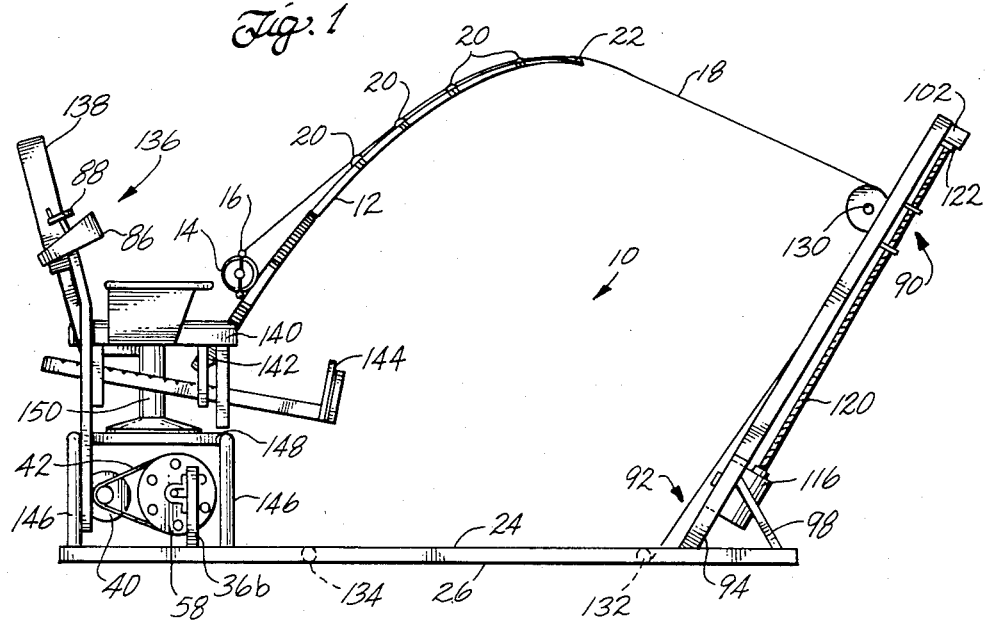
FIG. 1 is a side view of the device according to the present invention for use with a rod and reel.
Figure 2:
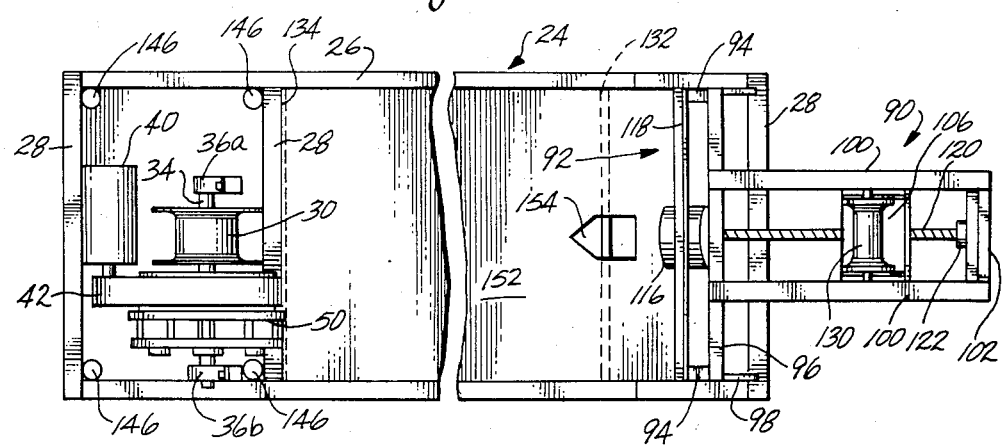
FIG. 2 is a partial plan view of the device of FIG. 1.

Turning to the drawings, FIGS. 1 and 2 show generally a device 10 for simulating a fish. The device 10 is particularly adapted to be used with a rod 12 and reel 14 of conventional construction. The reel 14 includes a spool (not shown) having wrapped thereabout a supply of fishing line 18 and means for playing out such line to deploy bait and for retrieving the line 18 to reel in a fish. The reel is operable so that the spool may be released for free wheeling to play out or cast fishing line and to capture the spool for rotation via a handle 16 for retrieving line. When the spool is coupled with the handle 16 for retrieval of fishing line, the coupling is such that the spool can be rotated to play out line in response to the tensioning of the fishing line 18 by, for example, the pull of a fish. To resist the playing out of fishing line the reel includes means for imposing a drag on the spool. The drag is selected to protect the fishing line from breaking by allowing the line to be played out from the spool against the resistance of the selected drag. For example, when the spool is coupled with the handle, and a fish is hooked and runs from the fisherman, fishing line is played out to prevent the line from breaking while imposing resistance to at least begin to tire the fish.

The drag may be adjusted to either increase or decrease the drag for playing of the fish.

The rod 12, which is flexible and typically manufactured from fiberglass or the like, provides in essence shock-absorbing means to prevent breakage of the line and is also useful for casting of line as is well known in the art.

On the rod 12 eyelets 20 are provided to guide the line from the reel to the tip of the rod which, for larger rods, may include a pulley-like tip eyelet 22.

To simulate a fish for the operation of the rod and reel, the device 10 is provided. The device 10 includes a frame 24 which is rectangular and flat preferably constructed from spaced, tubular steel, longitudinal members 26 and supporting cross members 28. The frame 24 provides structural rigidity and a firm base for the device 10 when it rests on a flat floor or the like. Of course, it is to be understood that the frame 24 could be fashioned in other configuration and from other materials without departing from the spirit and scope of the present invention.

To simulate a fish the device 10 also includes means for tensioning the fishing line 18 as best shown in FIGS. 2 and 3. The tensioning means preferably includes a drum 30 to which the fishing line from the rod and reel is attached. The drum 30 may be hollow having side flanges 32 to confine fishing line taken up by the drum 30 therebetween. As shown in FIG. 3, the drum 30 is fixed to a shaft 34 which is, in turn, journalled to the frame 24 for both forward (counterclockwise in FIG. 1) and reverse rotation (clockwise in FIG. 1). To support the shaft 34, the frame 24 includes a pair of upstanding supports 36a and 36b, support 36a including bearings 38 to provide for the rotation of the shaft 34. At its other end the shaft 34, in a manner described below, is also journalled to the support 36b.

To urge the shaft 34 and drum 30 to rotate to simulate a fish, means are provided for applying torque to the shaft 34 and drum 30. The torque tensions the fishing line 18 attached thereto which simulates the pull of a fish. It is against the aforementioned torque and resultant line pull which the rod and reel are operated to fight the simulated fish.

The means for applying torque to the drum and shaft include a motor 40 preferably of about ½ HP. The motor 40, when powered, rotates a pinion (not shown) to drive a toothed belt 42. The toothed belt 42, in turn, rotates a a toothed sprocket 44 which is journalled to the shaft 34 by bearings 35 for clockwise (FIG. 1) rotation thereabout.

The sprocket 44 via bolts 45 or the like is attached to a wheel 46 which is also journalled for rotation about the shaft 34 by bearings 48. The torque of the rotation of the sprocket 44 by the belt 42 is accordingly transmitted to the wheel 46 and to the shaft 34 through means which preferably include a clutch 50.

The clutch 50, as shown in FIG. 3, includes a rotor 52 which is fixed to the shaft 34 preferably via a splined connection providing for a limited degree of axial movement of the rotor 52 along the shaft 34. The rotor 52 includes a splined sleeve 54 which mate with the splines of the shaft 34 and a radially projecting rim 56 which lies parallel with the wheel 46. The rotor 52 is disposed between the wheel 46 and a pressure plate 58 which is journalled to the support 36b for rotation in an only clockwise direction as seen in FIG. 1. For this purpose, a sprague clutch 60 at the support 36b may be used. Bearings 62 journal the shaft 34 within the pressure plate 58 for rotation in each of the clockwise and counterclockwise directions.

The pressure plate 58 mounts a plurality of coil springs 64 each acting to urge a disc 66 to trap the rotor 52 and more particularly its rim 56 against the wheel 46. In a fully engaged position, the coil springs 64 of the clutch 50 are fully extended to urge the disc 66 against the rotor 52 and the rotor 52 against the wheel 56 to transmit the torque of the wheel 46 to the rotor 52 to the pressure plate 58. That is, in a manner well known in clutch devices, the frictional engagement of the disc 66, rotor 52 and wheel 46 acts to transmit the clockwise rotation and the torque of the wheel to the rotor 52 and pressure plate 58 and thereby to the shaft 34 and drum 30.

To provide for adjusting the torque imparted to the drum, the pressure plate 58 also mounts a plurality of spring loaded release levers 68. The levers 68 are joined at a ring 70 disposed about the shaft 34 and journaling the shaft 34 for rotation via a bearing 72. The ring 70 is axially movable to pivot the lever 68 to, in turn, displace struts 74 coupled to each of the levers and extending through the pressure plate 58. Each strut 74 is connected with the disc 66 such that upon displacement of the ring 70 and pivoting of the lever 68 the struts withdraw the disc 66 from the rotor 52 against the bias of the springs 64 to decrease the frictional engagement between the components and thereby adjust the torque transmitted to the shaft and drum.

To control the operation of the lever 68, the device 10 includes an actuator 76 which includes an arm 78 pivotally fixed to the frame 24 at a pin 80. One end of the arm 78 engages the ring 70 whereas the other end has mounted thereto a cable 82. The cable 82 passes through a guide 84 fixed to the frame 24 proximate the arm 78. From the guide 84 the cable extends upwardly to a panel 86 supported above the frame. At the panel 86 the cable 82 is secured to one end of a screw means, the other end having affixed thereto a control knob 88. Rotation of the control knob 88 acts to withdraw the cable 82 to pivot the arm 78 about the pin 80 and displace the ring 70 thereby actuating levers 68 and the strut 74 to selectively withdraw the disc 66 and control the torque transmitted to the shaft 34 and drum 30.

In operation, the line 18 from the rod and reel is secured to the drum 30 and the motor 40 is powered to rotate the sprocket 44 and wheel 46. To exert a selective torque to the drum 30 to simulate the pull of a fish, the knob 88 is operated from, for example, a disengaged position, to release the disc 66 to trap the rotor 52 against the wheel. In this fashion, due to the frictional engagement between the components, the torque of the wheel 46 is transmitted to the rotor 52 and pressure plate 56 and, via the rotor, to the shaft 34 and drum 30. Depending upon the operation of the rod and reel and the selected torque, the drum 30 may begin to rotate in a clockwise direction (FIG. 1) to pull the fishing line from the reel in a manner simulating a fish. Against this pull, the fisherman can selectively set the drag of the reel to counteract the torque as would be necessary in the fighting of a fish. To reel in line, the fisherman may pump the rod and operate the reel handle in a manner well known in the art to overcome the torque imposed upon the drum 30. In such instance, the pull of the fisherman would overcome the torque imposed upon the drum 30 and would begin to rotate the shaft 34 and drum 30 in the reverse, counterclockwise direction as line is retrieved from the drum 30 and is reeled on to the spool of the reel 14. In that the only coupling between the motor and the drum 30 is the frictional engagement provided for by the clutch 50, overcoming such engagement permits the fisherman to reel in line to simulate the fighting of and reeling in of the fish. It should be understood that when reeling in, the reverse (counterclockwise) rotation imparts angular momentum to only the drum 30, rotor 52 and shaft 34. The sprocket 44 and wheel 46 continue to rotate in a clockwise direction as driven by the belt 42 and the reverse rotation of the pressure plate 58 is restrained by the sprague clutch 60. By virtue of the foregoing, the mass rotating in the counterclockwise direction as the fisherman reels in the fishing line and the simulated fish is minimized to prevent overrunning of the drum 30 which could occur if all the components were to rotate therewith in the counterclockwise direction. Overrunning would generate a slack in the line which could possibly tangle about the components and which would, when the slack suddenly taken up by the sudden change of direction of rotation of the drum could snap the fishing line. Accordingly, the clutch 50 and the other cooperative components prevents such overrunning of the drum 30.

It is to be understood that other means could be used to prevent line slackening during reeling in such as imposing a bias on the line with spring loaded pulleys or the like.

To simulate a larger fish or the sudden running of a fish away from the fisherman, the operator need only control the knob 88 which controls the torque applied to the shaft 34 and drum 30. For example, to simulate a larger fish, the knob 88 is operated to further release the lever 68 to increase the frictional engagement between the rotating wheel 46 and the rotor 52. In this fashion, increased torque is applied to the shaft and drum. As can be appreciated, by adjusting the torque via the knob 88 the tension on the line and the simulated pull of the fish can be altered in a fashion to mimick the action of an actual fish as it is played. The fisherman, to counteract this action would appropriately adjust the drag and reel in line against such torque to play the fish. Accordingly, via the tensioning means described above, the fisherman can be instructed as to tactics of drag settings and reeling in line necessary for the playing of the fish and can experience the physical demands necessary to land particularly larger fishes. The device 10 can serve multiple functions including the teaching of tactics and the physical conditioning of the fisherman.

While the tensioning means described above are effective for simulating the pull of a fish and may solely be used, the device 10 further includes means for simulating the position of the fish relative to the fisherman. As shown in FIGS. 1 and 2, these means include a yoke 90 supported by and upstanding from the frame 24. The yoke 90 includes a base 92 having legs 94, each secured to a corresponding longitudinal member 26 at one end and connected to a beam 96 at the other end. The base 92 as shown particularly in FIG. 1, is inclined with respect to the frame 24, and is supported by a pair of braces 98 connected between the legs 94 and the frame 24. Upstanding from the base 92, and more particularly its beam 96, the yoke 90 includes a pair of parallel tracks 100 supported at their respective ends opposite the base 92 by an end support 102. Each of the tracks 100 may be and is preferably embodied as a hollow tube having a rectangular cross-section each defining a generally closed channel 101. The tracks 100 have facing and longitudinally extending slots 104 opening into each channel 101 the purposes of which will hereinafter become evident.

Guided by and mounted to the yoke 90, and more particularly its tracks 100, is a carriage 106, as shown in FIGS. 4 and 5. The carriage has forward and rear pairs of axles 108 and 110, respectively, each such axle supporting a roller adapted to be received within a channel 101 for one of the tracks 100. Of course, the use of only a single forward and rear axle each supporting a pair of rollers is also contemplated in the present invention. As shown in FIG. 4, each of the rollers 112 is spaced within the channel to provide for and guide the movement of the carriage 106 along the tracks 100. The rollers are preferably fashioned from a hard plastic or rubber material to provide for the smooth, quiet movement of the carriage 106 along the tracks 100.

To provide for the smooth operation of the carriage 106, one or a plurality of shims 114 are disposed about each of the axles between each roller 112 and the slot 104 as best shown in FIGS. 4 and 5. The shims 114 prevent the carriage 106 from shifting laterally as it moves along the tracks 100.

To displace the carriage 106 to simulate the location of a fish, displacement means are provided which include a reversible motor 116 mounted to the yoke base 92 as shown in FIGS. 1 and 2. The motor 116 is preferably about one-quarter horsepower. To accommodate the motor 116 a mounting brace 118 may be disposed across the legs 94 below the beam 96, the motor 116 being secured to the mounting brace 118. The shaft of the motor 116 is connected to a screw 120 which is also supported at a block 122 disposed at the end support 102. To couple the carriage 106 to the screw 120, the carriage includes a pair of depending tabs 124 each threadably receiving the screw 120. Accordingly, operating the motor 116, rotates the screw 120 to move the carriage 106 along the tracks 100. In that the motor 116 is reversible, the carriage 106 can be moved upwardly and downwardly along the tracks 100.

To control the motor 116 power is supplied thereto via a switch (not shown) at the panel 86. The switch is a three-position switch having a first, off position wherein the motor is deenergized and the carriage is held at the selected position. Moving the switch to a second position, operates the motor to rotate the screw 120 in a first direction to, for example, urge the carriage 106 upwardly along the tracks 100. Location of the switch in a third position energizes the motor to reversible rotate the screw 120 to lower the carriage 106 along the tracks 100.

To accommodate the fishing line 118, the carriage includes a pair of upstanding supports 126. The supports 126 rotatably support an axle 128 which mounts a pulley 130. The pulley 130 is free wheeling in that it can rotate in both clockwise and counterclockwise directions. As seen in FIG. 4, the pulley 130 is supported above the carriage 106.

Returning to FIG. 1, the line 18 from the rod and reel, is reeved about the pulley 130 and is directed downwardly around a first roller 132 journalled between the longitudinal members 26. The first roller 132 is positioned near the yoke base 92 so that the fishing line 18 extends closely to the yoke 90 safely out of the way. From the first roller 132, the fishing line 18 extends between the longitudinal members 26 guided by a second roller 134 and from there it is connected to the drum 30 of the tensioning means as described above. Operation of the tensioning means tensions the fishing line 18 to simulate the pull of a fish whereas the selective operation of the motor 116 locates the carriage 106 to the desired position to simulate the location of the fish. For example, while the fish is running the motor 116 may be operated to raise the carriage 106 simulating the increasing distance of the fish from the fisherman. When the fish is approaching the fisherman or is sounding, the motor 116 may be operated to lower the carriage 106 along the tracks 100 to simulate that action.

To simulate the catching and playing of larger game fishes, it may be required that the device 10 be used in conjunction with a chair 136 of the type typically used on boats. As is known in the art, the chair 136 includes a back 138 and seat 140 to accommodate the fisherman, the seat provided with a cup 142 for holding the base of the rod 12. To provide for leverage, the chair 136 also includes a foot brace 144 so that the fisherman can brace with his legs while pulling the rod towards his body to reel in fishing line 18. To accommodate the chair, the device includes upstanding columns 146 which may be in the form of steel tubes, the columns supporting a platform 148, for example, above the tensioning means. Secured to the platform 148 is a pedestal 150 for mounting the chair 136. In that this chair 136 can be expensive, the pedestal 150 conveniently provides for a fisherman to use the chair from his boat with the device 10. Of course, it is to be understood that the chair 136 can be removed to simulate shore fishing or fishing for smaller game fishes.

To cover the frame 24 a floor 152 may be disposed across the longitudinal members 26, the floor 152 provided with an opening 154 at the yoke end to accommodate the fishing line 18 from the pulley 130, the floor terminating adjacent the tensioning means to provide for the passage of the fishing line from the second roller 134 to the drum 30.

While we have shown and described several embodiments of the present invention, it is to be understood that it is subject to many modifications of that departing from the spirit and scope of the invention as set forth in the appended claims. For example, instead of using an upstanding yoke, a horizontal track or the like could well be used. Further the means for imparting torque to the shaft and drum and for adjusting torque could be modified to dispense with the need for the friction clutch and associated components.

What is claimed is:

1. A device for simulating a fish on a fishing line connected to a rod and reel comprising:
   a frame;
   a shaft journalled to the frame;
   a drum affixed to the shaft;
   means for attaching a fishing line from the rod and reel to the drum;
   a sprocket supported for rotation about the shaft;
   means for rotating the sprocket, a rotor affixed to the shaft, and a clutch adapted to frictionally couple the sprocket and rotor for imparting a torque to the shaft and drum; to tension the line and simulate the pull of a moving fish; and
   means for simulating the position of a fish including line receiving means disposed on the frame remote from the rod and reel, the fishing line from the rod and reel passed by the receiving means back to the drum.

2. The device of claim 1 further including means for adjusting the clutch and the frictional coupling for adjusting the torque imparted to the shaft and drum.

3. The device of claim 2 wherein the adjusting means includes a cable and means for moving the cable concealed from the view of a person using the device.

4. The device of claim 1 wherein the clutch includes a plate journalled for rotation to the frame and journally the shaft, a disc mounted to the plate and arranged to engage the rotor and means for displacing the disc to frictionally couple the sprocket, rotor and plate for imparting torque to the shaft.

5. The device of claim 4 wherein the disc displacing means is adjustable to adjust the torque imparted to the shaft and drum.

6. The device of claim 4 including means for preventing the plate from rotating in the direction which the drum rotates when line is played out from the drum.

7. A device for simulating a fish on a fishing line connected to a rod and reel comprising:
   a frame;
   a drum journalled to the frame,
   means for attaching a fishing line from the rod and reel to the drum;
   means for imparting a torque to the drum to tension the line and simulate the pull of a moving fish; and
   means for simulating the position of a fish including a pulley rotatably supported on the frame remote from the rod and reel and means for selectively locating said pulley on the frame to simulate the position of a fish, the fishing line reeved about the pulley and to the drum.

8. The device of claim 7 including a track, said pulley movable disposed on the track, the locating means positioning the pulley.

9. A device for simulating a fish on a fishing line connected to a rod and reel comprising:
   a frame;
   a drum journalled to the frame,
   means for attaching a fishing line from the rod and reel to the drum;
   means for imparting a torque to the drum to tension the line and simulate the pull of a moving fish; and
   means for simulating the position of a fish including;
   a track mounted to the frame,
   a carriage guided and supported by the track,
   means for positioning the carriage along the track, and
   a pulley rotatably supported on the carriage, the fishing line reeved about the pulley and connected to the drum, the position of the pulley simulating the position of a fish.

10. The device of claim 9 wherein the track is inclined.

11. Apparatus for simulating a fish on a fishing line comprising:
    a frame;

a fish fighting chair mounted on the frame including means for receiving a fishing rod;
a drum for receiving a fishing line from the rod;
at least one pulley for passing a fishing line between the chair and drum;
means for rotating the drum with variable torque and direction of rotation for applying differing tensions on a fishing line connected to the drum and means for varying the position of the pulley for changing the direction of the fishing line and simulating changing position of a fish on such line.

12. Apparatus as recited in claim 11 comprising:
means for selectively and independently varying the tension on the fishing line and the positon of the pulley relative to the chair.

* * * * *